United States Patent
Markwitz

[11] Patent Number: 5,216,715
[45] Date of Patent: Jun. 1, 1993

[54] KEY DISTRIBUTION IN PUBLIC COMMUNICATION NETWORKS TAKING ACCOUNT OF SECURITY GRADATIONS

[75] Inventor: Wernhard Markwitz, Munich, Fed. Rep. of Germany

[73] Assignee: Siemens Aktiengesellschaft, Munich, Fed. Rep. of Germany

[21] Appl. No.: 793,426

[22] PCT Filed: Apr. 5, 1990

[86] PCT No.: PCT/DE90/00270
§ 371 Date: Dec. 12, 1991
§ 102(e) Date: Dec. 12, 1991

[87] PCT Pub. No.: WO90/16124
PCT Pub. Date: Dec. 27, 1990

[30] Foreign Application Priority Data
Jun. 16, 1989 [DE] Fed. Rep. of Germany ....... 3919734

[51] Int. Cl.⁵ .............................................. H04L 9/02
[52] U.S. Cl. ........................................ 380/21; 380/23; 380/25
[58] Field of Search ................... 380/21, 23, 25, 30, 380/43, 45, 48

[56] References Cited
U.S. PATENT DOCUMENTS

| | | | |
|---|---|---|---|
| 4,438,824 | 3/1984 | Mueller-Schloer | 380/21 |
| 4,500,750 | 2/1985 | Elander et al. | 380/21 X |
| 4,567,600 | 1/1986 | Massey et al. | |
| 4,578,530 | 3/1986 | Zeidler | 380/21 |
| 4,587,627 | 5/1986 | Omura et al. | |
| 4,980,913 | 12/1990 | Skret | 380/23 |
| 5,018,196 | 5/1991 | Takaragi et al. | 380/23 X |
| 5,081,678 | 1/1992 | Kaufman et al. | 380/21 |

FOREIGN PATENT DOCUMENTS

| | | |
|---|---|---|
| 0048903 | 5/1982 | European Pat. Off. |
| 0205095 | 12/1986 | European Pat. Off. |
| 0307627 | 3/1989 | European Pat. Off. |
| 3123168 | 11/1982 | Fed. Rep. of Germany |

*Primary Examiner*—Tod Swann
*Attorney, Agent, or Firm*—Hill, Steadman & Simpson

[57] ABSTRACT

A public communication system for a plurality of communication services (ISDN) has an arrangement for the authentification of the subscriber stations (TLN A, TLN B) for the key transmission. For a first security level this authentification arrangement has an arrangement for monitoring the time frame (24) of the key transmission and/or an arrangement (A) for the indication of the agreed key in reduced form at the subscriber end, and for a second security level a key management station (SMZ) for authenticated traffic handling 8 Claims, 2 Drawing Sheets

KEY DISTRIBUTION IN PUBLIC COMMUNICATION NETWORKS TAKING ACCOUNT OF SECURITY GRADATIONS

BACKGROUND OF THE INVENTION

The invention relates to an arrangement and a method for key transmission in a public communication system having a plurality of subscriber stations.

In communication networks with an integrated services network such as ISDN represents for example, voice, text, data and images are transmitted over a line on a digital basis All services of a subscriber can be reached by the same call number on the same main subscriber line. This enables a flexible and versatile exchange of data between the various subscribers; however it is just this versatility of the various services offered which awakens the desire to exchange, besides public ones, also encrypted messages and data. In this case it is to be made more difficult for a third party to gain knowledge of the messages and data.

Various encryption methods are known for encrypting the data, for example symmetrical encryption methods or encryption methods with so-called public keys. In addition, in particular the three-pass protocol (U.S. Pat. specification No. 4,567,600, U.S. Pat. specification No. 4,587,627) and, for example, the method with a codeword (German Patent Specification 3,123,168) are of significance as encryption methods.

The encryption methods used here must be such that the various services of the network, such as, for example, conference connections, abbreviated numbers and connection establishment abbreviated for example by means of name keys by storage of the connections frequently dialled, are fully retained.

In order to ensure the authenticity of the subscribers, that is to say to verify that the transmission did in fact take place to the desired subscriber, it is customary to provide in the network a key distribution station on the basis of the public key systems, in which the keys for transmission are generated and distributed. In addition, all the call numbers and the associated public keys of all subscribers must be maintained there.

Key distribution stations of this type represent the main point of attack and the security weak point of the entire network. It is therefore necessary to protect them comprehensively.

In communication networks for a plurality of communication services, the desire also exists to be able to employ protection methods with different security levels appropriate to the services used. Thus, a system which is particularly easy to use and does not hinder the communication should be used for the telephone service. For the other services, such as text and data, an automatically executed protection method would be advantageous.

SUMMARY OF THE INVENTION

The object of the invention is to provide an arrangement and a method of the type mentioned at the beginning with which it is possible, without a comparatively large outlay and without any loss of security, to ensure, besides the confidentiality, also the authenticity of the subscribers.

This object is achieved in an arrangement and a method a public communication system having a plurality of subscriber stations, in which a key is agreed to between a transmitting station and a receiving station for the encrypted transmission of messages, and in which a cryptographic device is provided in each of the transmitting station and the receiving station, to which device a station key is assigned. The arrangement of the present invention has the following: the communication system has an arrangement for authentification of the subscriber stations for the key transmission,; depending on the desired security level of the key transmission and/or the operating mode of the subscriber stations, the arrangement for authentification has, on a first level preferably for voice communications, a device for monitoring the time frame of the key transmission and/or an arrangement for the indication of the agreed key in reduced form (HASH function) at the subscriber end, on a second level for automatic traffic handling, a key management station with integrated cryptographic device which, before the actual key transmission, receives an identification message block encrypted with a first key from the transmitting station and forwards it encrypted with a second key to the receiving station, in which the identification message block has code words addressing the transmitting and receiving station and authentification code words, derived from the agreed key, of a checking sequence.

The method of the present invention has the following steps: the transmitting station specifies the key to be agreed to, calculates an authentification code for this and forms an identification message block with the identification code of the subscribers contained therein, the identification message block is encrypted by the transmitting station with a first key and transmitted to the key management station, the key management station decrypts the identification message block, checks the authenticity of the subscriber A and transmits the modified identification message block encrypted with a second key to the receiving station, and the receiving station notifies the transmitting station for the key transmission of the agreed key.

Advantageous embodiments of the invention are as follows: A public key assigned to the key management station is used as a first key. A private key assigned to the key management station is used as a second key or a public key assigned to the receiving station is used as a second key. The public communication system is designed as a communication system for a plurality of communication services, in which each subscriber station can have a multiplicity of terminals with different functions. Also, the arrangement can be used in a mobile radio network.

The authenticity of the subscribers is also ensured as a result of the arrangement for authentification of the subscriber stations constructed according to the invention if symmetrical encryption methods are used in which a special key is agreed for each connection. The entire system is secure from all types of attack.

The arrangement according to the invention adapts flexibly to the various services of a network for all communication services. For instance, on a first security level, preferably in telephone traffic, the time frame for the key transmission is monitored by means of a device of simple construction, and the key used is indicated in bit-reduced form on a display in the subscriber stations. The key representation is selected here so that it is not possible to reconstruct the key itself from the reduced form. This can be effected, for example, in that in a hash function, for example, the first, fifth and eighth bit of the key is indicated on the display, whereupon the subscribers then compare the values of the indicated bits over the telephone and thus verify the authenticity. Which values are indicated can be previously agreed in the form of a codeword, for example. Owing to the monitoring of the time frame of the key transmission itself, it is possible to detect masked attackers and take appropriate measures against them.

This configuration of the arrangement is particularly advantageous for the in house communication.

In order to ensure in an advantageous manner an automatic traffic handling, in particular for the secure transmission of texts, data and images, on a second level the communication system has a key management station with integrated cryptographic device. This key management station protects the authenticated connection establishment between the transmitting and the receiving station, the key management station, referred to as SMZ for short in the following text, forming a sort of relay station and the actual key transmission itself not being effected via this SMZ. In contrast to a key distribution station, therefore, the SMZ does not contain any data relating to the key used (session key). As a consequence, the key management station need not be especially protected during communications and can even be installed, for example, as private equipment in the network. Any manipulation at the key management station can be detected at an early stage by the subscribers.

To protect the connection paths between the key management station and the subscribers, an identification message block is transmitted during the connection establishment which is encrypted by the transmitting subscriber with a public key of the SMZ. The message block decrypted by the SMZ is then encrypted once more by the SMZ, to be precise either with a private station key of the SMZ or, to avoid an early traffic analysis, with a public key of the receiving station.

The SMZ thus flags the message block transmitted by the transmitting station to the receiving station for the purpose of authentification. Although it is then possible for an attacker to record the contents of the message, that is to say the contents of the identification message block, the cannot however alter the contents thereof unnoticed. The information transmitted in the message block in the form of authentification code words (MAC) allow the receiving subscriber to identify the transmitting subscriber during the key transmission itself. It is not possible to reconstruct the agreed key from the authentification code words.

The authenticity of the subscribers can be ensured in public communication systems in a simple and secure manner by the use of a key management station. Any commutative encryption methods can be used for the key transmission itself. Besides the use of the system in integrated services networks, the use in mobile radio networks is advantageous.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures in which like reference numerals identify like elements, and in which:

DESCRIPTION OF THE PREFERRED EMBODIMENT

In an ISDN network, not illustrated here in detail, for all communication services, both voice and text, data and images are transmitted over a line on a digital basis. All services of a subscriber can be reached by the same call number on the same main subscriber line. The network is designed here in such a way that it is possible, besides the public ones, to exchange also encrypted messages between the subscribers, the type of encryption depending on the required security level.

Figure 2:
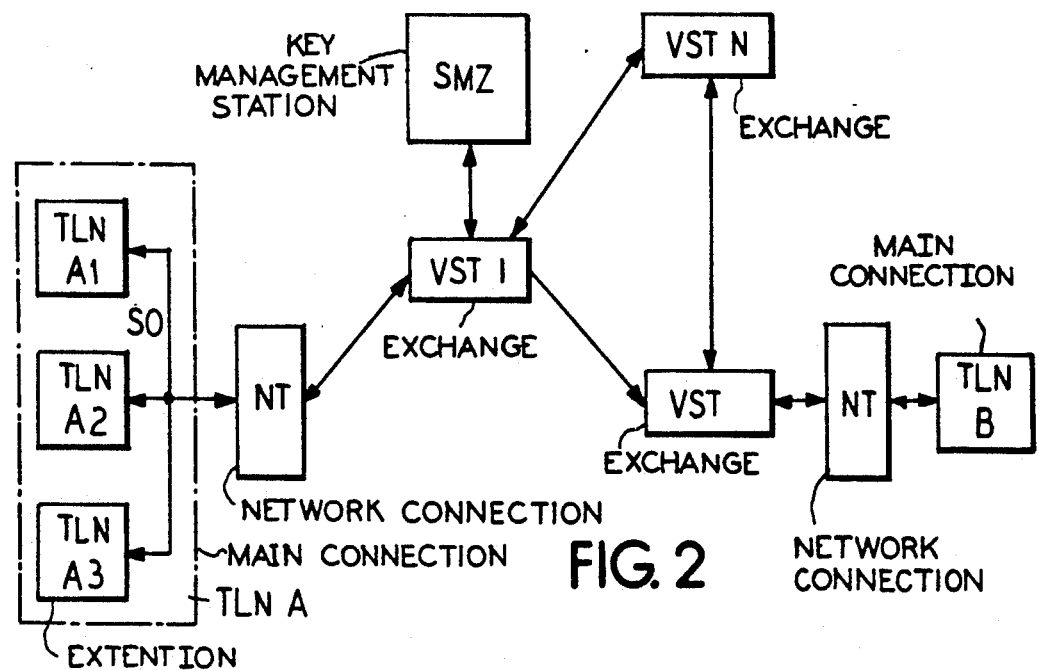
FIG. 2 shows a schematic block circuit diagram of a public communication system for a plurality of communication services with integrated key management station.

In this arrangement, every subscriber of the network can exchange messages with every other subscriber. For reasons of clarity, only two main connections, namely TLN A and TLN B, are shown in the communication network designed in accordance with FIG. 2. However, depending on the configuration level, each individual main connection may comprise a plurality of extensions TLN A1 to TLN A3, which are part of a private branch exchange. Network connection units NT are assigned in a conventional manner to the main connections TLN A, TLN B in each case. The connection is established via exchanges VSTI to VSTn (FIG. 2). The communication network may furthermore have a key management station SMZ, the function and design of which will be explained later.

Each main connection contains an ISDN interface SO, via which a plurality of extensions TLN A1 to TLN A3 can be connected to one another.

Figure 1:
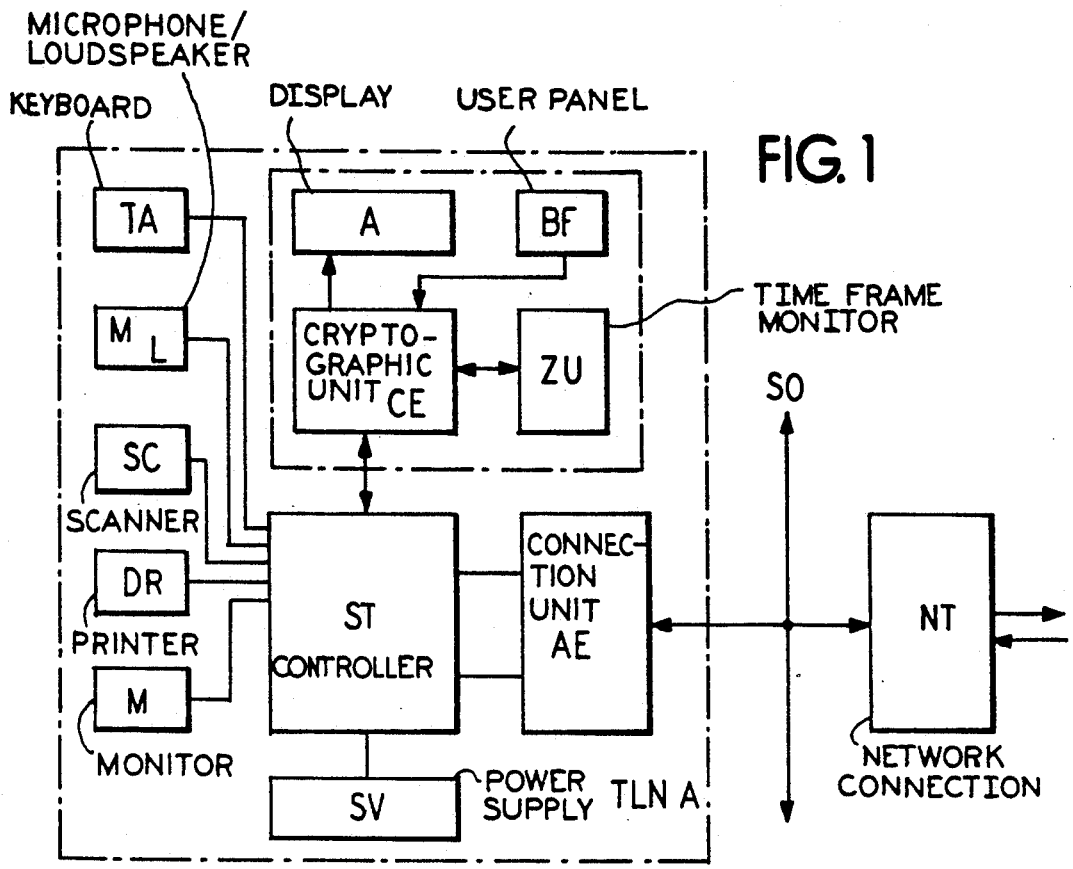
FIG. 1 shows a schematic block circuit diagram of a subscriber station in a communication system for a plurality of communication services with associated cryptographic unit.

According to FIG. 1, a main subscriber line TLN A has a controller ST with associated power supply SV. The input/output devices are connected to the controller ST, the type and the number of the input/output devices depending on the type and the number of the various services of the communication network. In the specified exemplary embodiment of FIG. 1, the following input/output devices are assigned to the controller: keyboard TA; microphone/loudspeaker unit M/L; scanner SC; printer DR and monitor M. A cryptographic unit CE, which can be operated via a user panel BF, is assigned to the controller ST for transmitting and for receiving encrypted messages. The cryptographic unit CE has a display device A for indicating the transmitted key in reduced form (HASH function). Furthermore a device for monitoring the time frame of the key transmission ZU, is provided. Connected to the ISDN interface ST is the controller ST, and hence the main subscriber line TLN A via a connection unit AE.

Depending on the desired security level of the key transmission and/or the operating mode of the subscriber stations, the communication network has an appropriately designed arrangement for authentification.

This arrangement for authentification consists on a first configuration level—preferably for voice communications between extensions TLN A1 to TLN A3—of the described cryptographic unit CE with associated display device A for the indication of the agreed key in reduced form (HASH function) at the subscriber end and/or the device ZU for monitoring the time frame of the key transmission.

The device ZU monitors the time frame during the key transmission and signals any exceeding or shortfall in the given frame on the user panel BF. Such an exceeding or deviation from the time frame may occur if a masked attacker switches into the network and imitates another subscriber.

The display device A can furthermore be equipped in the form of a display on which, for example, depending on the agreement between the subscribers themselves, the first, fifth and eighth bit of the agreed key are indicated after the key exchange.

A cross-wise verification of these agreed bits over the telephone and the voice recognition may serve for authentification of the subscribers after the key transmission. The communication with a low security level is preferably suitable for voice communications in the traffic among the extensions themselves. However it is also possible between a plurality of main connections over the communication network.

Symmetrical encryption methods are used in the exemplary embodiments described. However, in general it is also possible to use other encryption methods.

In particular the three-pass protocol (U.S. Pat. specifications No. 4,567,600, 4,587,627 both of which are hereby incorporated by reference) and the method with codeword (German Patent Specification 3,123,168, corresponding to U.S. Pat. No. 4,587,532 hereby incorporated by reference) are of significance for the key distribution methods.

For low security levels, preferably for voice communications, the invention will now be explained in greater detail with reference to these two key distribution methods.

It is assumed that the subscriber TLN A would like to communicate with the subscriber TLN B over the telephone using the three-pass protocol key distribution method. The following procedure then results:

First of all the subscriber A randomly generates the station key (session key $SK_A$) of the calling station A and also the parameter $e_A$ and calculates the parameter $d_A$, where $e_A \times d_A = 1$, and where module $\phi$ (M = P − 1).

After these basic parameters have been defined by the calling station A, the calling station A (TLN A) transmits the station key $SK_A$ of the station A encrypted with parameter $e_A$ and module P (mod P) to the subscriber B (TLN B).

$$(SK_A)^{e_A}_{mod\ p}$$

The subscriber B randomly generates a parameter $e_B$ and calculates $d_B$. The subscriber TLN B then encrypts the key $(SK_A)^{e_A}$ received from the subscriber A with its own key $e_B$, module P (mod P) and transmits the subscriber A key over-encrypted in this way back to the subscriber A.

$$[(SK_A)^{e_A}]^{e_B}_{mod\ p}$$

The subscriber A in turn over-encrypts the key block received from the subscriber B with $d_A$, mod P in the following manner:

$$\{[SK_A)^{e_A}]^{e_B}\}^{d_A}_{mod\ p} = (SK_A)^{e_B}_{mod\ p}$$

From this the subscriber B accordingly calculates $$[(SK_A)^{e_B}]^{d_B}_{mod\ p} = SK_A$$

Both stations are then in possession of the key $SK_A$ (session key) of the station A.

For authentification of the subscribers, the time frame of the key exchange is monitored with the aid of the monitoring device ZU. This monitoring device may be of conventional design and records the agreed and defined time frames during the key exchange. If the time frame is exceeded, this may be an indication that a masked attacker has switched into the communication. This exceeding of the time frame is also indicated at the subscriber end on the calling station on the user panel BF. As additional security, or independently thereof, the exchanged key is then indicated in reduced form in accordance with a HASH function on the display A of the two subscribers. This may be effected, for example, in that in accordance with the agreement, the first, the fifth and the eighth bit of the key appears bit by bit on the display unit A and in that this indication is then verified over the telephone.

Once the authenticity of the subscribers has been verified in this way, in a next step the customary synchronization of the crypto generators in the symmetrical method illustrated is effected and the encrypted message transmission may commence.

A key distribution method with codeword in accordance with German Patent Specification 3,123,168 may invention.

In this method, codewords $P_0$, $P_4$, $P_5$, and $P_6$, for example in the form of passwords, are known only to subscriber A and subscriber B. Furthermore, as with the preceding method, p is known as the prime number of elements in the network.

In accordance with the previously described method, first of all the calling station (TLN A) randomly generates the station key $SK_A$ and the value $e_A$ and calculates $d_A$. The subscriber TLN A then transmits this station key $SK_A$ randomly generated in this manner encrypted in accordance with the following function to subscriber B:

$$[(SK_A\ mod 2\ P_0)^{e_A}_{mod\ p}\ mod\ 2\ P_4]$$

The subscriber B randomly generates the values and calculates $d_A$. The subscriber B then transmits the crypted key received from the subscriber A overencrypted back to subscriber A, to be precise in accordance with the function:

$$[(SK_A\ mod\ 2\ P_0)^{e_A}_{mod\ p}\ mod\ 2\ P_4\ mod\ 2\ P_4]^{e_B}_{mod\ p}\ mod\ 2\ P_5$$

It should be ensured here that mod 2 $P_4$ mod 2 $P_4$ is identical to zero.

In a subsequent step the subscriber A transmits the key block encrypted by the subscriber B once more to the subscriber B in accordance with the following function:

$$\{\{[((SK_A\ mod\ 2\ P_0)^{e_A})^{e_B}_{mod\ p}\ mod\ 2\ P_5]mod\ 2\ P_5\}^{d_A}_{mod\ p}\ mod\ 2\ P_6\} =$$

$$[(SK_A\ mod\ 2\ P_0)^{e_B}_{mod\ p}\ mod\ 2\ P_6]$$

By addition of mod 2 of $P_6$ and by exploitation with $d_B$, this results in $$\{[(SK_A \bmod 2\ P_0)^{eB} \bmod 2\ P_6] \bmod 2\ P_6\}^{dB} = SK_A \bmod 2\ P_0$$

If $P_0$ is added to this, $SK_A$, namely the station key (session key), of the calling station can be calculated. Both subscribers are now in possession of the key, and in this case too the time monitoring arrangement ZU monitors the key exchange by means of the given time window and activates a warning device at the user panel BF if the time window is exceeded.

In a next step, the agreed key, reduced bit by bit by means of a HASH function, is indicated on the displays at the subscriber ends and can be verified over the telephone line by calling up the bits individually. Once the authenticity of the subscribers has been verified, the customary synchronization of the cryptogenerators and the transmission of the encrypted messages are effected.

With both the methods described above using the authentification arrangement according to the invention, on a first security level it is possible to carry out a key transmission for which an authentification of the subscribers is possible, for example, by means of speech. An automatic authentification of the subscribers is not possible.

Such an automatic authentification of the subscribers can be accomplished by arranging a key management station with integrated cryptographic device SMZ in the communication system in accordance with FIG. 2. This key management station SMZ permits an automatic traffic handling, in particular for the transmission of texts, data and images. The key management station protects the authenticated connection establishment between the transmitting and the receiving station, the key management station forming a sort of relay station and the actual key transmission itself not being effected via this key management station. In contrast to the known key distribution station, a key management station does not contain any data relating to the key used, but rather it corresponds more to an exchange. The key management station flags the message block transmitted by the transmitting station to the receiving station for the purpose of authentification, and thus protects the authentification.

In the most general case this is effected in that first of all the subscriber A, that is to say the calling station A, first of all randomly generates the station key $SK_A$ and calculates with it an authentification code (MAC number) of the message to be transmitted and the checking sequence. The calling station subscriber A forms from this authentification code an identification message block with an identification code contained therein for identifying the calling and called subscriber B. The identification message block is then encrypted with a first key, which may be a public key of the key management station SMZ for example, and transmitted to the key management station SMZ. The key management station SMZ decrypts the identification message block, verifies the specifications of TlnA, modifies the identification message block, and transmits the identification message block encrypted with a second key, which may be a station key (secret key) of the key management station SMZ for example, to the subscriber B, namely the receiving station. After evaluation of the message block, the receiving station then notifies the station A for the actual key transmission of the agreed key. A wide variety of key transmission methods can then be used for this actual key transmission. After the synchronization of the cryptogenerators, in the case of a symmetrical cryptographic method an error checking sequence CS is transmitted from the subscriber A to the subscriber B. The subscriber B can then verify with the previously received authentification code (MAC number) whether the subscriber A is in actual fact its current partner. The design of such a key management station is also derived from this basic authentification procedure: it contains a memory device with testing unit for receiving and evaluating the identification message block transmitted by the calling station A, as well as a cryptographic device for encryption and decryption. Furthermore, an automatic calling device for establishing the connection between SMZ and the called subscriber. A detailed description of the design will be given in connection with FIG. 3.

If a method with three-pass protocol in accordance with U.S. Pat. specification 4,567,690 or 4,587,627 is used in a public communication network of the type described with a key management station, then in detail the following method steps result for the authentification and the key transmission:

The following abbreviations are used here for the brief description of the function: SMZ: key management station; $PK_{SMZ}$: public key of the key management station; $SK_{SMZ}$: station key (secret key) of the key management station; CS: error checking sequence; MAC: message authentification code; $P_0$, $P_4$, $P_5$, $P_6$: codewords (passwords) known to the subscribers (TLN A, TLN B) in question; CRC: cyclic redundancy checkword; DU: date/time.

In the description of the method it should be noted that, depending on the type of encryption method used, the composition of the transmitted identification message block may vary. The important point here is, however, that authentification of the subscribers is carried out before the actual key transmission.

With a three-pass protocol method, this is represented as follows:

The subscriber TLN A randomly generates the station key $SK_A$ and the function $e_A$. Furthermore, it specifies, for example, the codewords $P_0$, $P_4$, $P_5$, $P_6$ and defines the error checking sequence CS. Following this it calculates the function $d_A$ as well as the authentification code (MAC), which is a function of the error checking sequence and of the connection key $SK_A$.

$$MAC\ (CS, SK_A)$$

If required, it also specifies the cyclic redundancy checkword CRC as a function of: subscriber TLN A, subscriber TLN B; codewords; priority, date/time DU, authentification code MAC (text, $SK_A$); authentification code MAC (CS, $SK_A$).

Once the parameters have been defined on the part of the subscriber A, the subscriber A transmits an identification message block which is formed from these parameters and contains an identification code for identifying the subscribers TLN A and TLN B, which are designated in the text which follows by the subscriber names TLN A and TLN B. This identification code is information for the key management station in order to be able to recognize the identification message block transmitted by the subscriber A as having really been transmitted from subscriber A, and to forward it modified to the subscriber B. The identification message block can have the following structure here:

$$\{TLN\ A;\ TLN\ B;\ P_{0,4,5,6};\ priority;\ DU,\ MAC\ (\text{text},\ SK_A);$$

-continued

MAC (CS, SK$_A$); CRC}$_{PKSMZ}$

This identification message block encrypted in this way with the public key of the key management station for the transmission from the subscriber A to the key management station is decrypted in the key management station SMZ with the aid of the cryptographic device arranged therein, modified and encrypted once more with the aid of a station key (secret key) of the key management station and then transmitted to the subscriber B in accordance with the following function:

{TLN A; TLN B; P$_{0,4,5,6}$; priority; DU, MAC (text, SK$_A$); MAC (CS, SK$_A$), CRC}$_{SKSMZ}$ Once the receiving station TLN B has received the identification message block, the subscriber B notifies the subscriber A by assigning a stored call number to the identification code for the actual key transmission. The actual key transmission can then be effected here in accordance with the previously described three-pass protocol or using codewords in accordance with the method of German Patent Specification 2,123,168.

After the synchronization of the cryptogenerators, the subscriber A sends the error checking sequence CS to the subscriber B. Using the previously received authentification code MAC (CS, SK$_A$), the subscriber B can verify whether the subscriber A is in actual fact its current partner. This ensures a full authentification of both subscribers.

In some circumstances an early traffic analysis is possible by listening in and decrypting the identification message block during the transmission from the key management station SMZ to the subscriber B. However, this analysis does not influence the authentification since although an attacker can read the contents of the identification message block in the manner of a window effect, he cannot alter it. It is consequently impossible for an attacker to influence the authentification of the subscribers.

If, however, an early traffic analysis is also to be rendered impossible, then the method described can be varied in such a way that the identification message bock is not encrypted with the station key SK$_{SMZ}$ of the key management station SMZ, but with the public key of the subscriber TLN B, namely PK$_{TLN B}$, during the transmission of the identification message block from the key management station SMZ to the subscriber B. On the one hand this requires a higher outlay in the key management station, namely for maintaining the lists of public keys of the subscribers for example, but on the other hand it does make the early traffic analysis in the network impossible. Only a traffic analysis, not any decryption of the messages, is possible in the key management station itself since the actual transmission of the encrypted messages is effected independently of the key management station.

Figure 3:
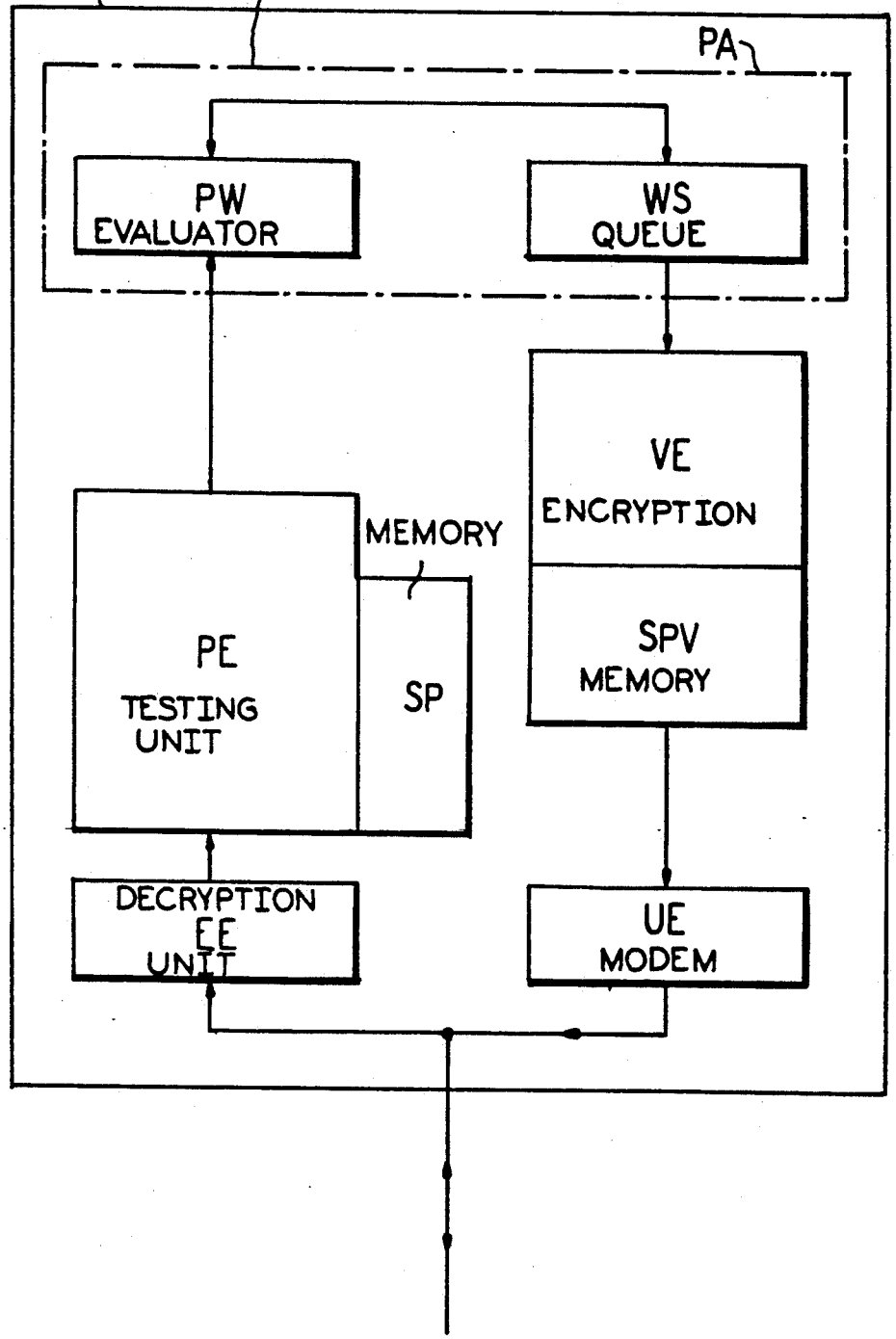
FIG. 3 shows a schematic illustration of the structural design of a key management station.

The described key management station SMZ can now be constructed in accordance with FIG. 3.

It is microprocessor-controlled and contains a decryption unit EE of conventional design for decrypting the identification message block arriving from the subscriber A with the corresponding key, for example SK$_{SMZ}$. Furthermore a testing unit PE for checking the authenticity of the calling subscriber A, by decrypting the identification code with the PK$_{TLNA}$ for example. This must produce the date, the serial number, the secret station number and the subscriber number.

Functionally connected to the testing unit PE is a memory SP. It contains a directory of the subscribers (TLN A) as well as the PK$_{TLNA}$ for example, the last serial number and the secret station number. With a modification of the key management station SMZ it is also possible to provide an arrangement PA for priority evaluation PW with associated queue WS (memory). This is advantageous if there are a multiplicity of subscribers in the network. The arrangement PA can likewise be constructed in the conventional way here.

An encryption unit VE is provided for encrypting the identification message block with the keys SK$_{SMZ}$ or PK$_{TLNB}$. If the public key of the called subscriber PK$_{TLNB}$ is used for encryption, then the encryption unit VE contains a memory SPV for receiving a directory of the subscribers (TLNB) with associated PK$_{TLNB}$. A transmission unit (modem) UE connected to the encryption unit VE serves as an automatic calling device for establishing the connection between SMZ and the called subscriber TLNB.

The invention is not limited to the particular details of the apparatus and method depicted and other modifications and applications are contemplated. Certain other changes may be made in eh above described apparatus and method without departing from the true spirit and scope of the invention herein involved. It is intended, therefore, that the subject matter in the above depiction shall be interpreted as illustrative and not in a limiting sense.

What is claimed is:

1. An arrangement for key transmission in a public communication system having a plurality of subscriber stations, in which a key ia agreed to between transmitting station of the plurality of subscriber stations and a receiving station of the plurality of subscriber stations for encrypted transmission of messages, and in which a cryptographic device is provided in each of the transmitting station and the receiving station, to which device a station key is assigned, comprising:

a) means for authentification of the subscriber stations for the key transmission, b) depending on at least one of a security level of the key transmission and an operating mode of the subscriber stations, the means for authentification has, c) on a first level, a means for monitoring a time frame of the key transmission and a means for indication of the agreed key in reduced form at a respective subscriber station of the plurality of subscriber stations, d) on a second level for automatic traffic handling, a key management station with integrated cryptographic device which, before key transmission, receives an identification message block encrypted with a first key from the transmitting station and forwards it encrypted with a second key to the receiving station, in which the identification message block has code words addressing the transmitting station and receiving station and authentification code words, derived from the agreed key of a checking sequence.

2. The arrangement or key transmission in a public communication system according to claim 1, wherein a public key assigned to the key management station is used as a first key.

3. The arrangement for key transmission in a public communication system according to claim 2, wherein a private key assigned to the key management station is used as a second key.

4. The arrangement for key transmission in a public communication system according to claim 2, wherein a public key assigned to the receiving station is used as a second key.

5. The arrangement for key transmission in a public communication system according to claim 1, wherein the public communication system is a communication system for a plurality of communication services, in which at least one subscriber station of the plurality of subscriber stations has a multiplicity of terminals with different functions.

6. The arrangement for key transmission in a public communication system according to claim 1, wherein the public communication system is a mobile radio network.

7. The arrangement for key transmission in a public communication system according to claim 1, wherein the first level is for voice communication between subscriber stations of the plurality of subscriber stations.

8. A method for key transmission in a public communication system having a plurality of subscriber stations in which a key is agreed between a transmitting station of the plurality of subscriber stations and a receiving station of the plurality of subscriber stations of encrypted transmission of messages, and in which a cryptographic device is provided in each of the transmitting stations and the receiving stations, and having a key management station, comprising the steps of:
   a) in the transmitting station specifying a key to be agreed to, calculating an authentification code of the key and forming an identification message block with an identification code of the subscribers contained therein,
   b) encrypting the identification message block in the transmitting station with a first key and transmitting the identification message block to the key management station,
   c) in the key management station, decrypting the identification message block, checking the authenticity of eh transmitting station and transmitting the identification message block encrypted with a second key to the receiving station, and
   d) in the receiving station notifying the transmitting station, in which the key was specified, for the key transmission of the agreed key.

* * * * *